United States Patent [19]
Hedrich

[11] 3,804,612

[45] *Apr. 16, 1974

[54] COMBATING NUTSEDGE WITH 1-METHYL-4-PHENYLPYRIDINIUM SALTS

[75] Inventor: Loren W. Hedrich, Overland Park, Kans.

[73] Assignee: Gulf Research & Development Company, Pittsburgh, Pa.

[ * ] Notice: The portion of the term of this patent subsequent to June 5, 1990, has been disclaimed.

[22] Filed: Apr. 21, 1972

[21] Appl. No.: 246,332

Related U.S. Application Data

[63] Continuation-in-part of Ser. No. 144,246, May 7, 1971, Pat. No. 3,737,299.

[52] U.S. Cl. .................................................. 71/94
[51] Int. Cl. ............................................... A01n 9/22
[58] Field of Search ......................................... 71/94

[56] References Cited
UNITED STATES PATENTS

| | | | |
|---|---|---|---|
| 3,575,985 | 4/1971 | Ritchie et al. | 260/290 |
| 2,847,414 | 8/1958 | Schmidle et al. | 260/290 |
| 3,069,253 | 12/1962 | Sovsa | 71/94 |
| 2,734,815 | 2/1956 | Mowry et al. | 71/94 |
| 3,697,251 | 10/1972 | Long et al. | 71/94 |

OTHER PUBLICATIONS

Schlesinger et al. Chem Abst. Vol. 53 (1959) 15455b.

*Primary Examiner*—Lewis Gotts
*Assistant Examiner*—Catherine L. Mills
*Attorney, Agent, or Firm*—Richard L. Kelly

[57] ABSTRACT

Nutsedge is combated with quaternary 1-methyl-4-phenylpyridinium salts in which the anion may vary and one or more of a limited number of substituents may be present on the cation. The active agents are toxic only to nutsedge and a few other species when applied post-emergently.

2 Claims, No Drawings

COMBATING NUTSEDGE WITH 1-METHYL-4-PHENYLPYRIDINIUM SALTS

This application is a continuation-in-part of U.S. Patent application, Ser. No. 144,246 filed May 17, 1971, now U.S. Pat. No. 3,737,299.

DESCRIPTION OF THE INVENTION

In U.S. Pat. No. 3,737,299 there was disclosed the combating of nutsedge with 1-methyl-4-phenylpyridinium halides and methylsulfate. It has now been discovered that the primary toxic component of the nutsedge control agents is the 1-methyl-4-phenylpyridinium ion and that variation of the anion and placing of a few substituents in specific positions on the 1-methyl-4-phenylpyridinium ion may modify the properties of the active agent but without substantially increasing post-emergent efficacy on nutsedge. Briefly, my method of combating nutsedge comprises the step of applying to the locus of the nutsedge an effective amount of a quaternary 4-phenylpyridinium salt in which the positive ion has the structural formula

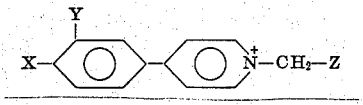

in which X may be hydrogen, fluoro, methyl or bromo, Y may be hydrogen or chloro and Z may be hydrogen or carboxy.

Although the nature of the positive ion is critical, considerable latitude is permissible in selection of the anion. For example, anions which may make up the negatively charged portions of the quaternary salts of this invention include the iodide, bromide, chloride, methylsulfate, fluorosulfonate, thiocyanate, p-toluenesulfonate, chloroferrate, acetate, perchlorate, nitrate, methanesulfonate, mono-, di-, and tri- basic phosphates, mono- and di- basic sulfate, mono- and di- basic oxalate, also anions of organic acids such as the propionate, butyrate, acrylate, stearate, oleate, adipate, succinate, tartrate, citrate, malonate, palmitate, trichloroacetate, nicotinate, benzoate, phenoxyacetate, picolinate, isonicotinate, carbonate, cyclopropanecarboxylate, and various anions derived from alkyl or aryl, saturated or unsaturated, substituted or unsubstituted mono-, di-, or tri- sulfonic acids, such as, ethanesulfonate, propanesulfonate, trifluoromethanesulfonate, benzenesulfonate, 4-chlorobenzenesulfonate, 1,4-butanedisulfonate, 1,3,5-benzenetrisulfonate, 1,5-naphthalenedisulfonate, naphthalenesulfonate, and dodecanesulfonate. The quaternary pyridinium salts of this invention may also contain anions of other acidic substances, such as, picric acid, trihaloimidazole, phthalimide, succinimide, 1,8-naphthalimide, hydrazoic acid, cyanic acid, nitrous acid, isocyanic acid, boric acid, phosphorous acid, and silicic acid.

The above list is illustrative of the variation permissible with respect to the anions of the quaternary salts and is not intended to be complete. Variation of the anions may be desirable, in some instances so as to modify water solubility and surface activity of the salts or to facilitate formulation for the purpose of reducing hazards involved in accidental spills and skin contact.

If an area is heavily infested with nutsedge, a preferred method of combating the pest is to apply to the locus of the growing nutsedge a sufficient amount of one of the toxicants of this invention and after these plants have been killed, then subject the soil to shallow tilling, so as to stimulate dormant nutsedge bulbs and tubers to sprout, then repeat the application of the nutsedge toxicant. Repetition of the procedure will eventually reduce the infestation to the point at which the problem becomes one of preventing reinfestation, so that less toxicant and labor are then required to maintain control.

The nutsedge toxicants employed according to this invention are also effective against a few other weeds, such as wild oats and wild buckwheat in some instances, but in general they are severely injurious to very few species of plants. 1-Methyl-4-phenylpyridinium salts are preferred.

Among compounds of closely related structural formulas there is observable a negative correlation between toxicity to nutsedge and toxicity to other species. Toxicity to nutsedge is a relatively rare property, not possessed by 2-, 3- or 4- phenylpyridine, nor by salts of 2- or 3-phenylpyridine, nor by many other compounds of closely related structural formulas, as disclosed herein.

PREPARATION OF THE WEED CONTROL COMPOUNDS

The active quaternary pyridinium compounds may be prepared from commercially available starting materials by the general methods illustrated in the specific procedures described below:

Preparation of 1-(3'-methylbutyl)-4-phenylpyridinium iodide

A solution of 4-phenylpyridine (4.7 g, 0.03 mol) and 3-methyl-1-iodobutane (5.9 g, 0.03 mol) in 50 ml of dry dimethyl formamide was heated to 50° on an oil bath and stirred gently for 48 hr. The solution was poured into 250 ml of anhydrous ether. The resulting yellow solid was isolated by filtration and washed with a small amount of acetone affording 8.1 g. (76%) of product, m.p. 190.5° – 191.5° (dec).

Anal. Calcd. for $C_{16}H_{20}IN$: C, 54.50 H, 5.70 N, 3,96

Found: C, 54.56 H, 5.64 N, 4.03

Preparation of 1-methyl-4-phenylpyridinium chloride

A solution of methyl chloride (11.1 g, 0.22 mol) in 100 ml of dry dimethyl formamide was prepared. A polytetrafluoroethylene-coated magnetic stirring bar and 4-phenylpyridine (31.1 g, 0.20 mol) were placed in a 125 ml glass pressure vessel. The methyl chloride solution was added and the pressure vessel was sealed immediately. A homogeneous solution resulted, following a few minutes of stirring. The vessel was placed in an oil bath at room temperature. Over a period of 60–90 minutes the temperature was increased to 100°C. This temperature was maintained for 2 hr. The contents were allowed to cool to room temperature while the vessel remained in the oil bath and the stirring was continued. The vessel was opened after being chilled in an ice-water bath. the off-white crystalline solid was removed by filtration and washed with anhydrous ether. The yield of product was 36 g (87%), m.p. 116.5°–118.0°.

Anal. Calcd. for $C_{12}H_{12}ClN \cdot 1/2\ H_2O$
  C, 67.13, H, 6.10, N, 6.52
  Found: C, 67.00, H, 6.41, N, 6.67

Preparation of 1-methyl-4-phenylpyridinium thiocyanate

A suspension of 30 g of Amberlite CG–400 (100 mesh) (Cl⁻ form) ion exchange resin in 100 ml of 1N NaOH was magnetically stirred in a beaker for 1 hr. The resin was removed by vacuum filtration, using a Buchner funnel, and washed with distilled water until the washings were no longer basic. The resin was suspended in 100 ml of water containing 10 g of potassium thiocyanate and stirred for 1 hr. The isolation of the resin was repeated and washed 3 times with water. The resin was suspended in a solution of 5 g of 1-methyl-4-phenylpyridinium iodide in 150 ml of water and 20 ml of methanol. After stirring overnight the suspension was filtered and washed with four 50-ml portions of water. The filtrate was distilled to dryness affording 3.5 g (90%) of a semi-solid product. Infrared and NMR spectra confirmed the presence of the desired product.

Calcd. for $C_{13}H_{12}N_2S$: C, 68.38; H, 5.29

Found: C, 68.86; H, 6.09

Preparation of 1-methyl-4-phenylpyridinium fluorosulfonate

To a solution of 4-phenylpyridine (6.2 g, 40 mmol) in 75 ml of ether was added dropwise methyl fluorosulfonate (4.6 g, 40 mmol). Product formed immediately and after 1 hr of stirring at room temperature was removed by filtration affording 10.3 g (96%) m.p. 122.0°–125.0°.

Calcd. for $C_{12}H_{12}FNSO_3$: C, 53.52; H, 4.49; N, 5.20

Found: C, 53.68; H, 4,56; N, 5.73

In the case of less reactive, substituted 4-phenylpyridines, the amine was dissolved in the minimum required amount of acetonitrile. The procedure from this point was identical to that outlined above except for a longer reaction time required for the latter.

Preparation of 1-methyl-4-phenylpyridinium chloroferrate

To a solution of 1-methyl-4-phenylpyridinium chloride (6.1 g, 30 mmol) in 30 ml of 10% HCl was added at once with stirring 30 ml of a filtered solution of ferric chloride (20 g, 0.12 mol). A bright yellow solid formed almost immediately. The product (6.1 g, 55%) was isolated by filtration and recrystallized from glacial acetic acid, m.p. 102.5° – 103.5°

Calcd. for $C_{12}H_{12}Cl_4FeN$; C, 39.17; H, 3,28; N, 3.80

Found: C, 39.83; H, 3.31; N, 4.04

The quaternary phenylpyridinium compounds included in the list below have been made by procedures of the type illustrated above.

TABLE I

COMPOUNDS PREPARED AND TESTED AS HERBICIDES

| NO. | NAME | M.P. |
|---|---|---|
| 1 | 1-methyl-4-phenylpyridinium iodide | 167.0–168.0° |
| 2 | 1-Methyl-4-phenylpyridinium methylsulfate | 162.0–163.5° |
| 3 | 1-Methyl-4-phenylpyridinium chloride | 116.5–118.0° |
| 4 | 1-Ethyl-4-phenylpyridinium iodide | 132.0–133.0° |
| 5 | 1-Allyl-4-phenylpyridinium iodide | 130.0–131.0° |
| 6 | 1-methyl-4-phenylpyridinium bromide | 120–142° |
| 7 | 1- (3-Methylbutyl)-4-phenylpyridinium iodide | 190.5–191.5° |
| 8 | 1-Isopropyl-4-phenylpyridinium iodide | 106.0–107.5° |
| 9 | 1-Butyl-4-phenylpyridinium iodide | 163.5–165.0° |
| 10 | 4-phenyl-1-(thiomethoxymethyl)pyridinium chloride | 205–6° |
| 11 | 4-Phenyl-1-propargylpyridinium bromide | 206–8° |
| 12 | 1-Heptyl-4-phenylpyridinium iodide | 119.5–210.0° |
| 13 | Mixture of 2-, 3- and 4- (4'-methoxyphenyl)-1 methylpyridinium chloride | 75–95° |
| 14 | 4-Phenylpyridine-1-oxide | 154–5° |
| 15 | 1-Methoxy-4-phenylpyridinium methylsulfate | oil |
| 16 | 1-Benzyl-4-phenylpyridinium chloride | 243–5° (dec) |
| 17 | 4-(p-Fluorophenyl)-1-methylpyridinium iodide | 140–5° |
| 18 | 4-(m-Chlorophenyl)-1-methylpyridinium iodide | 150–3° |
| 19 | 4-(p-Bromophenyl)-1-methylpyridinium chloride | oil |
| 20 | 1-(4-Nitrobenzyl)-4-phenylpyridinium bromide | 205–10° |
| 21 | 1-(4-Chlorobenzyl)-4-phenylpyridinium chloride | 95–100° |
| 22 | 1-(4-Fluorophenacyl)-4-phenylpyridinium chloride | 252–5° (dec) |
| 23 | 1-(3-Methylbenzyl)-4-phenylpyridinium chloride | 185–90° |
| 24 | 1-Carbomethoxymethyl-4-phenylpyridinium chloride | 178° (dec) |
| 25 | 1-Methyl-4-phenylpyridinium fluorosulfonate | 122–5° |
| 26 | 1-Chlorobutyl-4-phenylpyridinium chloride | 220–1° |
| 27 | 1,1'-Trimethylenebis(4-phenylpyridinium bromide) | 202–4° |
| 28 | 1,1'-Methylenebis(4-phenylpyridinium iodide) | 224–5° |
| 29 | 1,1'-ethylenebis(4-phenylpyridinium bromide) | 279–80° |
| 30 | 1-Hydroxyethyl-4-phenylpyridinium bromide | 112–5° |
| 31 | 1-Carbethoxyprop-1-yl-4-phenylpyridinium bromide | 182–4° |
| 32 | 1-Carboxyethyl-4-phenylpyridinium chloride | 189–91° |
| 33 | 1-Diallylcarbamoylmethyl-4-phenylpyridinium chloride | 185–7° |
| 34 | 1-Diethylcarbamoylmethyl-4-phenylpyridinium | 208–10° |
| 35 | 1-Iodomethyl-4-phenylpyridinium iodide | 130–1° |
| 36 | 1-Cyanomethyl-4-phenylpyridinium chloride | 200–2° |
| 37 | 1-(2-Dimethylaminoethyl)-4-phenylpyridinium chloride hydrochloride | 170–75° |
| 38 | 1,1'-Tetramethylenebis-4-phenylpyridinium bromide | 248° (dec) |
| 39 | 1-Bromobutyl-4-phenylpyridinium bromide | 200–2° |
| 40 | 1-Carboxymethyl-4-phenylpyridinium chloride | 151° (dec) |
| 41 | 1-Methyl-4-phenylpyridinium p-toluenesulfonate | 152–3° |
| 42 | 1-Methyl-4-phenylpyridinium chloroferrate | 102.5–3.5° |
| 43 | 1-Methyl-4-phenylpyridinium acetate | oil |
| 44 | 1-Methyl-4-phenylpyridinium perchlorate | 143–4° |
| 45 | 1-Methyl-4-phenylpyridinium nitrate | oil |
| 46 | 1-Bromopropyl-4-phenylpyridinium bromide | 140–2° |
| 47 | 1-Di-(ethoxycarbonyl)methyl-4-phenylpyridinium bromide | 148–9° |
| 48 | 1-Methyl-4-phenylpyridinium phosphate | 214–6° |
| 49 | 1-Methyl-4-phenylpyridinium sulfate | oil |

TABLE I—Continued

COMPOUNDS PREPARED AND TESTED AS HERBICIDES

| NO. | NAME | M.P. |
|---|---|---|
| 50 | 1-Methyl-4-phenylpyridinium thiocyanate | oil |
| 51 | 1-Methyl-4-phenylpyridinium oxalate | oil |
| 52 | 4-(3',4'-dimethylphenyl)-1-methylpyridinium iodide | 195–9° |
| 53 | 1-Methyl-4-p-tolylpyridinium iodide | 79–80° |
| 54 | 4-(p-Methoxyphenyl)-1-methylpyridinium iodide | 210–12° |
| 55 | 1-Methyl-4-m-trifluoromethylphenylpyridinium fluorosulfonate | 200–5° |
| 56 | 1-Isothiocyanotomethyl-4-phenylpyridinium chloride | 95–8° |
| 57 | 3,5-Carbethoxy-4-phenyl-1,2,6-trimethylpyridinium fluorosulfonate | 167–9° |
| 58 | 1-Methoxymethyl-4-phenylpyridinium methanesulfonate | 122.5–5.0° |
| 59 | 1-Nitromethyl-4-phenylpyridinium bromide | 146–57° |
| 60 | 3,5-Dicarboxy-4-phenyl-1,2,6-trimethylpyridinium fluorosulfonate | 280–1° |
| 61 | 4-Phenyl-1,2,6-trimethylpyridinium iodide | 267° |
| 62 | 4-Carboxy-9-oxo-1,2,3-trimethyl-9H-indeno[2-1-c]-pyridinium fluorosulfonate | 262–3° |
| 63 | 9-oxo-1,2,3-trimethyl-9H-indeno[2,1-c]pyridinium fluorosulfonate | 189–90° |
| 64 | 4-(p-Nitrophenyl)-1-methylpyridinium fluorosulfonate | 191–3° |

Use of the Active Compounds in Controlling Nutsedge

POST-EMERGENT USE

An aqueous dispersion of each active compound was prepared by combining 0.4 gram of the compound with about 4 ml of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots of each species were sprayed with an aqueous dispersion of the active compound prepared as described above, at rates of 1 lb and 3 lb of active compound per acre and at a spray volume of 60 gallons per acre. Approximately one week after the spray application the plants were observed and the results rated according to the following schedule.

DEGREE OF EFFECT

0 = no effect
1 = slight effect, (all plants recovered)
2 = moderate effect
3 = severe effect
4 = maximum effect (all plants died)

Results are summarized in the following table, indicating relative toxicity of several compounds to 24 species of plants.

TABLE II

Post-Emergent Use of 4-Phenylpyridinium Salts

| COMPOUND NO. | 1 | | 2 | | 3 | |
|---|---|---|---|---|---|---|
| LB/A | 3 lb/A | 1 lb/A | 3 lb/A | 1 lb/A | 3 lb/A | 1 lb/A |
| Plant Species | | | | | | |
| Cocklebur | 0 | 0 | — | — | 1 | 0 |
| Lambsquarters | 1 | 0 | 2 | 0 | 1 | 0 |
| Morningglory | 0 | 0 | 1 | 0 | 1 | 0 |
| Pigweed | 0 | 0 | 0 | 0 | 1 | 0 |
| Wild Buckwheat | 0 | 0 | 2 | 0 | 3 | 2 |
| Wild Mustard | 0 | 0 | 2 | 0 | 1 | 0 |
| Barnyard Grass | 0 | 0 | 1 | 1 | 2 | 0 |
| Crabgrass | 0 | 0 | 2 | 0 | 2 | 1 |
| Downy Brome | 0 | 0 | 0 | 0 | 0 | 0 |
| Giant Foxtail | 0 | 0 | 0 | 0 | 1 | 0 |
| Green Foxtail | 2 | 0 | 1 | 0 | 2 | 0 |
| Nutsedge | 3 | 2 | 2 | 0 | 3 | 2 |
| Shattercane | 0 | 0 | 1 | 0 | 0 | 0 |
| Wild Oats | 0 | 0 | 0 | 0 | 0 | 0 |
| Alfalfa | 1 | 0 | 0 | 0 | 1 | 0 |
| Cotton | 2 | 1 | 2 | 1 | 2 | 1 |
| Peanut | 1 | 0 | 0 | 0 | 0 | 0 |
| Soybean | 1 | 0 | 1 | 0 | 1 | 0 |
| Sugar Beets | 1 | 0 | 1 | 0 | 1 | 1 |
| Tomato | 1 | 1 | 2 | 1 | 2 | 1 |
| Corn | 0 | 0 | 0 | 0 | 0 | 0 |
| Grain Sorghum | 0 | 0 | 1 | 0 | 0 | 0 |
| Rice | 0 | 0 | 0 | 0 | 0 | 0 |
| Wheat | 0 | 0 | 0 | 0 | 0 | 0 |
| COMPOUND NO. | 4 | | 5 | | 6 | |
| LB/A | 3 lb/A | 1 lb/A | 3 lb/A | 1 lb/A | 3 lb/A | 1 lb/A |
| Plant Species | | | | | | |
| Cocklebur | 0 | 0 | 0 | 0 | 0 | 0 |
| Lambsquarters | 1 | 0 | 1 | 0 | 0 | 0 |

TABLE II – Continued

Post-Emergent Use of 4-Phenylpyridinium Salts

| COMPOUND NO. | 4 | | 5 | | 6 | |
|---|---|---|---|---|---|---|
| LB/A | 3 lb/A | 1 lb/A | 3 lb/A | 1 lb/A | 3 lb/A | 1 lb/A |
| Plant Species | | | | | | |
| Morningglory | 1 | 0 | 1 | 0 | 0 | 0 |
| Pigweed | 1 | 0 | 0 | 0 | 0 | 0 |
| Wild Buckwheat | 1 | 0 | 0 | 0 | 1 | 0 |
| Wild Mustard | 1 | 1 | 0 | 0 | 1 | 0 |
| Barnyard Grass | 1 | 1 | 0 | 0 | 0 | 0 |
| Crabgrass | 0 | 0 | 0 | 0 | 1 | 0 |
| Downy Brome | 0 | 0 | 0 | 0 | 0 | 0 |
| Giant Foxtail | 0 | 0 | 0 | 0 | 0 | 0 |
| Green Foxtail | 1 | 0 | 0 | 0 | 2 | 1 |
| Nutsedge | 0 | 0 | 0 | 0 | 3 | 2 |
| Shattercane | 0 | 0 | 0 | 0 | 0 | 0 |
| Wild Oats | 0 | 0 | 3 | 1 | 0 | 0 |
| Alfalfa | 1 | 0 | 0 | 0 | 0 | 0 |
| Cotton | 1 | 1 | 0 | 0 | 1 | 1 |
| Peanut | 0 | 0 | 0 | 0 | 0 | 0 |
| Soybean | 1 | 0 | 0 | 0 | 1 | 0 |
| Sugar Beets | 2 | 1 | 0 | 0 | 1 | 0 |
| Tomato | 1 | 0 | 1 | 0 | 1 | 1 |
| Corn | 0 | 0 | 0 | 0 | 0 | 0 |
| Grain Sorghum | 0 | 0 | 0 | 0 | 0 | 0 |
| Rice | 0 | 0 | 0 | 0 | 0 | 0 |
| Wheat | 0 | 0 | 0 | 0 | 0 | 0 |

| COMPOUND NO. | 7 | | 9 | | | |
|---|---|---|---|---|---|---|
| LB/A | 3 lb/A | 1 lb/A | 3 lb/A | 1 lb/A | 3 lb/A | 1 lb/A |
| Plant Species | | | | | | |
| Cocklebur | 0 | 0 | 0 | 0 | | |
| Lambsquarters | 0 | 0 | 0 | 0 | | |
| Morningglory | 2 | 1 | 0 | 0 | | |
| Pigweed | 0 | 0 | 0 | 0 | | |
| Wild Buckwheat | 1 | 0 | 0 | 0 | | |
| Wild Mustard | 2 | 1 | 1 | 0 | | |
| Barnyard Grass | 0 | 0 | 0 | 0 | | |
| Crabgrass | 0 | 0 | 0 | 0 | | |
| Downy Brome | 0 | 0 | 0 | 0 | | |
| Giant Foxtail | 0 | 0 | 0 | 0 | | |
| Green Foxtail | 0 | 0 | 0 | 0 | | |
| Nutsedge | 0 | 0 | 1 | 0 | | |
| Shattercane | 0 | 0 | 0 | 0 | | |
| Wild Oats | 0 | 0 | 0 | 0 | | |
| Alfalfa | 0 | 0 | 0 | 0 | | |
| Cotton | 4 | 2 | 1 | 0 | | |
| Peanut | 0 | 0 | 0 | 0 | | |
| Soybean | 1 | 1 | 1 | 0 | | |
| Sugar Beets | 1 | 0 | 1 | 0 | | |
| Tomato | 1 | 1 | 1 | 0 | | |
| Corn | 0 | 0 | 0 | 0 | | |
| Grain Sorghum | 0 | 0 | 0 | 0 | | |
| Rice | 0 | 0 | 0 | 0 | | |
| Wheat | 0 | 0 | 0 | 0 | | |

Eighteen-Day Test of 1-Methyl-4-Phenylpyridinium Halides

In accordance with the observation that nutsedge plants die slowly after treatment with the herbicides, a longer period of time was allowed for a comparative test of preferred 1-methyl-4-phenylpyridinium halides at various application rates. The herbicides were used to spray wellestablished nutsedge plants growing in about 3 inches of soil in containers in the greenhouse. The spray mixtures were prepared by dispersing the active compounds in water with the aid of commercial solvents and surface active agents. The results were rated after 18 days according to the schedule set forth above and the plants were kept under observation for several more days to confirm the ratings. The results are summarized below.

TABLE III

Post-Emergent Use of 1-Methyl-4-Phenylpyridinium Halides

| Halide | Application Rate (lb/A) | Score after 18 days |
|---|---|---|
| I | 2 | 4 |
| Br | 2 | 4 |
| Cl | 2 | 4 |
| I | 1 | 4 |
| Br | 1 | 4 |
| Cl | 1 | 4 |
| I | ½ | 2 |
| Br | ½ | 3 |
| Cl | ½ | 3 |
| I | ¼ | 1 |
| Br | ¼ | 1 |
| Cl | ¼ | 1 |

In the same test, 1-methyl-, 2-phenyl- and 3- phenylpyridinium iodide, as well as the corresponding free bases were also applied for purposes of comparison at 2 lb per acre. There was no observable effect on the nutsedge.

In a greenhouse test of sensitivity of vegetable crops to 1-methyl-4-phenylpyridinium iodide, allowing 5 weeks for an injury to become apparent, it was found that lettuce, garden peas, carrots and sweet corn were not affected to any significant degree, even at levels as high as 4 lb per acre. Tomatoes exhibited only moderate effects at 4 lb per acre, which is more than three times the application rate necessary to kill nutsedge under the same growing conditions.

In further greenhouse tests on millet, nutsedge, alfalfa, oats, radishes, sugar beets and tomatoes, compounds numbered 17, 18, 25, 43, 44, 45, 48, 49, 50 and 51 gave complete kills of nutsedge at an application rate of 3 lb per acre, or less, with severe effects or complete kills of only one or two other species, usually sugar beets and occasionally tomatoes.

In use of the novel nutsedge control agents of this invention it is essential that the agricultural compositions for combating nutsedge be formulated with a substantial proportion of inert diluent. This is true for two reasons. First of all there is the problem common to all chemical weed control methods of obtaining uniform distribution of only a few pounds of active ingredients over a large area. This problem is intensified by the fact that nutsedge has narrow leaves and is most sensitive at early stages of growth before it has managed to store a great deal of energy in bulbs and tubers. A crude or spotty method of distribution of the toxicant is likely to miss many plants entirely and some plants will receive much less than the toxic dose. Because of the ability of nutsedge plants to spread and multiply, this should be avoided. So as to obtain uniform distribution and apply an effective amount to all of the nutsedge plants it is desirable to incorporate the pyridinium salt in a rather large amount of diluent, preferably water, and apply it at a high enough total spray volume to assure that every plant becomes wet with the spray mixture. Fortunately, dispersion of the quaternary toxicants in water is not difficult, because as a group they are quite soluble. In fact there is little need for surfactants or dispersing agents to disperse the quaternary toxicants themselves. It may be necessary to include dispersing agents in the formulation, however, so as to improve the dispersion in water of diluents such as inert solids, organic solvents or oils in which the toxicants are formulated for sale. The 1-methyl-4-phenylpyridinium salts are sufficiently soluble in both water and in a number of solvents that it is feasible to formulate water-dispersible concentrates of very high concentration. However, it is preferred to formulate the dispersible concentrates with a major amount of inert diluent, so as to minimize the hazards involved in accidental spillage during handling or use. This is particularly true in areas where some of the agricultural workers are unable to read the directions on labels. Wettable powders are often used as pesticide formulations of active ingredients which are extremely insoluble and difficult to formulate as liquid concentrates. In the case of the active ingredients used in the present method of combating nutsedge, it may be desirable to formulate the dispersible concentrates in the form of wettable powders so as to minimize the hazards involved in rupturing of containers or accidental spills prior to diluting with water. Since the herbicides themselves are quite soluble, the formulation of wettable powders is particularly easy and may be done by published procedures, consisting essentially of mixing a solution of active ingredient with a rolling bed of finely divided inert solid material such as clay, silica, chalk, talc and the like, followed by drying to remove solvent. It is preferable when preparing a wettable powder to include a dispersing agent, so as to obtain efficient dispersion of the inert solids on which the quaternary compounds are deposited. There are various commercial dispersing and suspending agents available for dispersing finely divided inert solids. Some of the lignosulfonate dispersing agents obtained as a by-product of the paper pulp industry are particularly useful for this purpose.

I claim:

1. A method of combating nutsedge comprising the step of applying to the locus of the nutsedge an effective amount of a quaternary 4-phenylpyridinium salt in which the positive ion has the structural formula

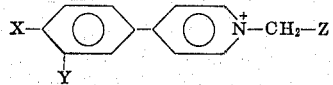

in which X is hydrogen, fluoro, methyl or bromo, Y is hydrogen or chloro and Z is hydrogen or carboxy.

2. A method of combating nutsedge comprising the step of applying to the locus of the nutsedge an effective amount of a 1-methyl-4-phenylpyridinium salt.

* * * * *